United States Patent
Al-Hmalan et al.

(10) Patent No.: US 8,957,787 B1
(45) Date of Patent: Feb. 17, 2015

(54) SYSTEM AND METHOD FOR DISABLED PARKING SPOT ENFORCEMENT

(71) Applicants: Al-Jouharah A. S. A. Al-Hmalan, Abdulla Mubarak (KW); Manar S. F. Al-Mutairi, Abdulla Mubarak (KW)

(72) Inventors: Al-Jouharah A. S. A. Al-Hmalan, Abdulla Mubarak (KW); Manar S. F. Al-Mutairi, Abdulla Mubarak (KW)

( * ) Notice: Subject to any disclaimer, the term of this patent is extended or adjusted under 35 U.S.C. 154(b) by 0 days.

(21) Appl. No.: 14/503,361

(22) Filed: Sep. 30, 2014

(51) Int. Cl.
- *B60Q 1/48* (2006.01)
- *G08G 1/017* (2006.01)
- *G06K 9/00* (2006.01)
- *H04N 7/18* (2006.01)
- *G06K 7/10* (2006.01)

(52) U.S. Cl.
CPC .......... *G08G 1/0175* (2013.01); *G06K 9/00771* (2013.01); *H04N 7/188* (2013.01); *G06K 7/10366* (2013.01)
USPC ........... 340/932.2; 340/937; 348/148; 367/93

(58) Field of Classification Search
USPC .......... 340/932.2, 933, 937; 348/148; 367/93; 705/13
See application file for complete search history.

(56) References Cited

U.S. PATENT DOCUMENTS

| | | | |
|---|---|---|---|
| 7,271,738 B2 | 9/2007 | Berstis et al. | |
| 7,791,501 B2 | 9/2010 | Ioli | |
| 2008/0258934 A1* | 10/2008 | Chemali | 340/932.2 |
| 2008/0277468 A1* | 11/2008 | Mitschele | 705/13 |
| 2012/0143657 A1* | 6/2012 | Silberberg | 340/932.2 |
| 2012/0274482 A1 | 11/2012 | Chen et al. | |
| 2012/0284209 A1 | 11/2012 | Duffy et al. | |
| 2013/0325564 A1* | 12/2013 | Kwong | 705/13 |

FOREIGN PATENT DOCUMENTS

| | | |
|---|---|---|
| FR | 2 770 015 | 4/1999 |
| GB | 2 403 837 A | 1/2005 |
| GB | 2461397 A | 1/2010 |
| JP | 2007-140931 | 6/2007 |
| KR | 10-0832357 | 5/2008 |
| KR | 10-2010-0048743 | 5/2010 |

* cited by examiner

Primary Examiner — Thomas Mullen
(74) Attorney, Agent, or Firm — Richard C Litman

(57) ABSTRACT

A system for disabled parking spot enforcement uses a proximity sensor for detecting entry of a vehicle within a parking spot designated for use by disabled people. A radiofrequency identification (RFID) tag reader is positioned adjacent the parking spot for polling for the presence of an RFID tag associated with the vehicle. An alarm is also positioned adjacent the parking spot, and the alarm is actuated for a pre-set period of time if an RFID tag associated with the vehicle is not detected. A camera is further positioned adjacent the parking spot for capturing a photographic image of a license plate associated with the vehicle if the RFID tag was not detected and if the vehicle did not exit the parking spot within the pre-set period of time. If the RFID tag was detected, identifying information therefrom is read and logged.

19 Claims, 3 Drawing Sheets

SYSTEM AND METHOD FOR DISABLED PARKING SPOT ENFORCEMENT

BACKGROUND OF THE INVENTION

1. Field of the Invention

The present invention relates generally to vehicles and vehicle parking, and particularly to a system and method for disabled parking spot enforcement using radio frequency identification (RFID) monitoring of disabled parking spots.

2. Description of the Related Art

Disabled parking permits (also known as handicapped parking permits) are used around the world to allow parking of a vehicle within dedicated disabled parking spaces reserved for people who have satisfied requirements to receive the placard, specifically by a person whose mobility would be otherwise significantly impaired by age, illness, disability or infirmity. Typical permits are in the form of a placard displayed through the windshield of the vehicle. Such permits, however, are difficult to monitor. In order to properly enforce the usage of disabled parking spaces by those with valid permits, a police officer or other parking enforcement officer must be physically present in order to validate the presence of the permit. Additionally, as such permits are typically provided in the form of a simple placard, the manufacture and usage of counterfeit placards is a well-known problem.

Thus, a system and method for disabled parking spot enforcement addressing the aforementioned problems is desired.

SUMMARY OF THE INVENTION

The system for disabled parking spot enforcement uses a proximity sensor for detecting entry of a vehicle within a parking spot designated for use by disabled people. A radiofrequency identification (RFID) tag reader is positioned adjacent the parking spot for polling for the presence of an RFID tag associated with the vehicle. An alarm is also positioned adjacent the parking spot, and the alarm is actuated for a pre-set period of time if an RFID tag associated with the vehicle is not detected. A camera is further positioned adjacent the parking spot for capturing a photographic image of a license plate associated with the vehicle if the RFID tag was not detected and if the vehicle did not exit the parking spot within the pre-set period of time. If the RFID tag was detected, identifying information therefrom is read and logged. The identifying information can be compared against authentication information stored in a database. Additionally, line sensors can be provided for detecting if the vehicle is properly parked within the designated boundaries of the parking space (i.e., within the line markings defining the parking space). If the vehicle is parked over one of the lines (i.e., partially parked in an adjacent space), then the alarm can also be actuated.

These and other features of the present invention will become readily apparent upon further review of the following specification and drawings.

BRIEF DESCRIPTION OF THE DRAWINGS

Unless otherwise indicated, similar reference characters denote corresponding features consistently throughout the attached drawings.

DETAILED DESCRIPTION OF THE PREFERRED EMBODIMENTS

Figure 1:
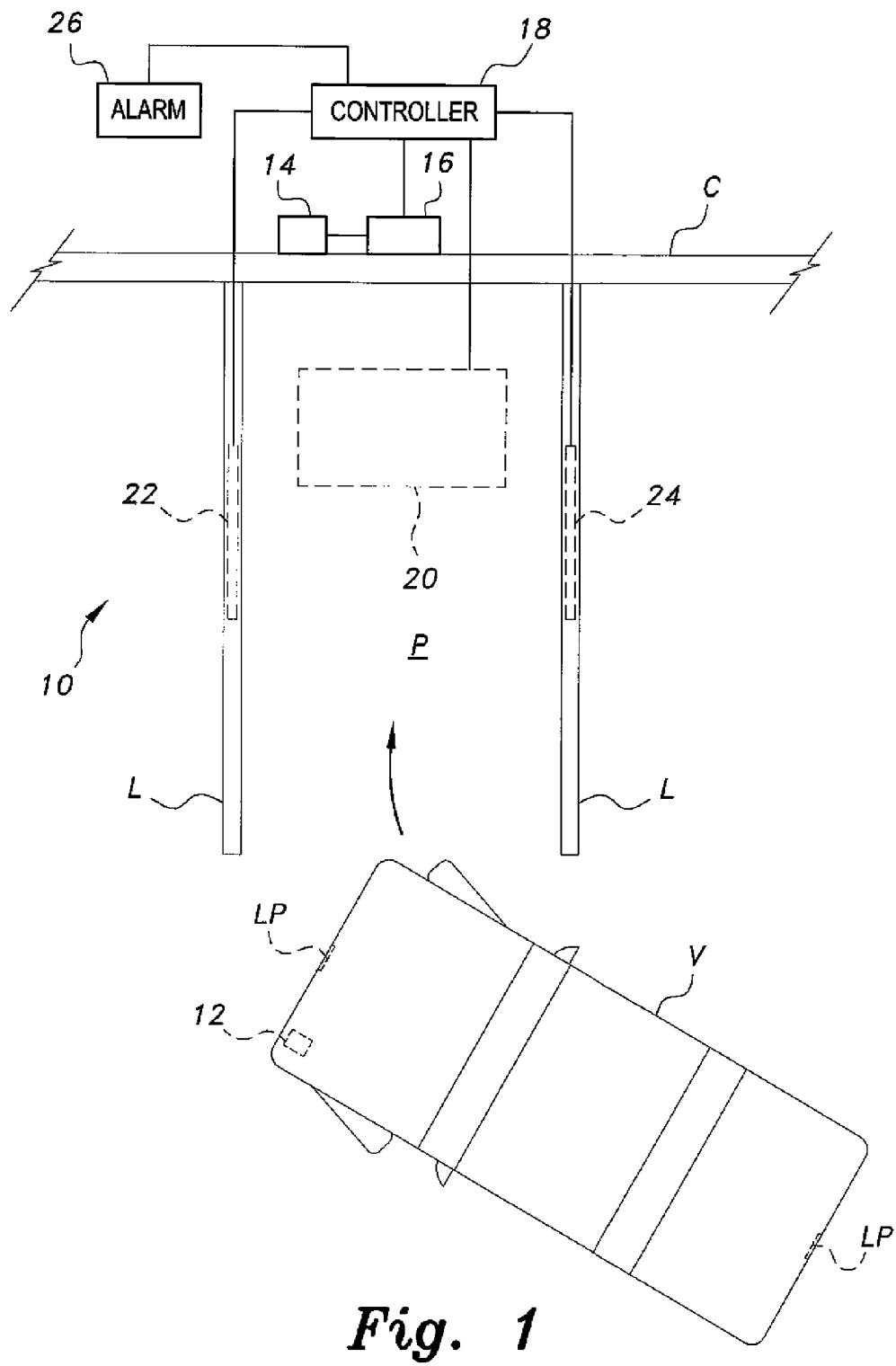
FIG. 1 diagrammatically illustrates an embodiment of a system for disabled parking spot enforcement according to the present invention.

As shown in FIG. 1, the system for disabled parking spot enforcement 10 uses a proximity sensor 20, such as can include one or more ultrasonic sensors, for example, for detecting entry of a vehicle V within a parking space or a parking spot P designated for use by disabled people. In the exemplary diagrammatic illustration of FIG. 1, the parking spot P is defined between line markings L and a curb C, although it should be understood that this arrangement is shown for exemplary purposes only. A radiofrequency identification (RFID) tag reader 14, such as can include an ultra-high frequency (UHF) long range reader, for example, is positioned adjacent the parking spot for polling for the presence of an RFID tag 12 associated with the vehicle V. It should be understood that the positioning of the RFID tag 12 on vehicle V in FIG. 1 is shown for illustrative purposes only, and that the RFID tag can be mounted on any of various suitable locations on the vehicle V, or can be integrated therein, for example.

An alarm 26 is also positioned adjacent the parking spot P, and the alarm 26 is actuated for a pre-set period of time, such as 30 seconds, for example, if the RFID tag 12 associated with the vehicle V is not detected. The alarm 26 can be any suitable type of alarm, such as an audio alarm, such as generating an alert by a speaker, or a visual alarm, such as generating a visual alert by a light source, or a combination thereof. A camera 16, such as can include an internet protocol (IP) camera with software development kit (SDK), as can include a plate recognition SDK, for example, is also positioned adjacent the parking spot P for capturing a photographic image of a license plate LP associated with the vehicle V, as well as can also capture all or a portion of the vehicle V, if the RFID tag 12 was not detected and if the vehicle V did not exit the parking spot P within the pre-set period of time. It should be understood that any of various suitable types of cameras can be utilized and/or various types of visual sensors or image sensors can also be utilized in this regard, for example. The alarm 26, the RFID tag reader 14, the camera 16, the proximity sensor 20, and line sensors 22, 24 (to be described below) are each in electrical communication with a controller 18, as will be discussed in greater detail below.

Figure 2:
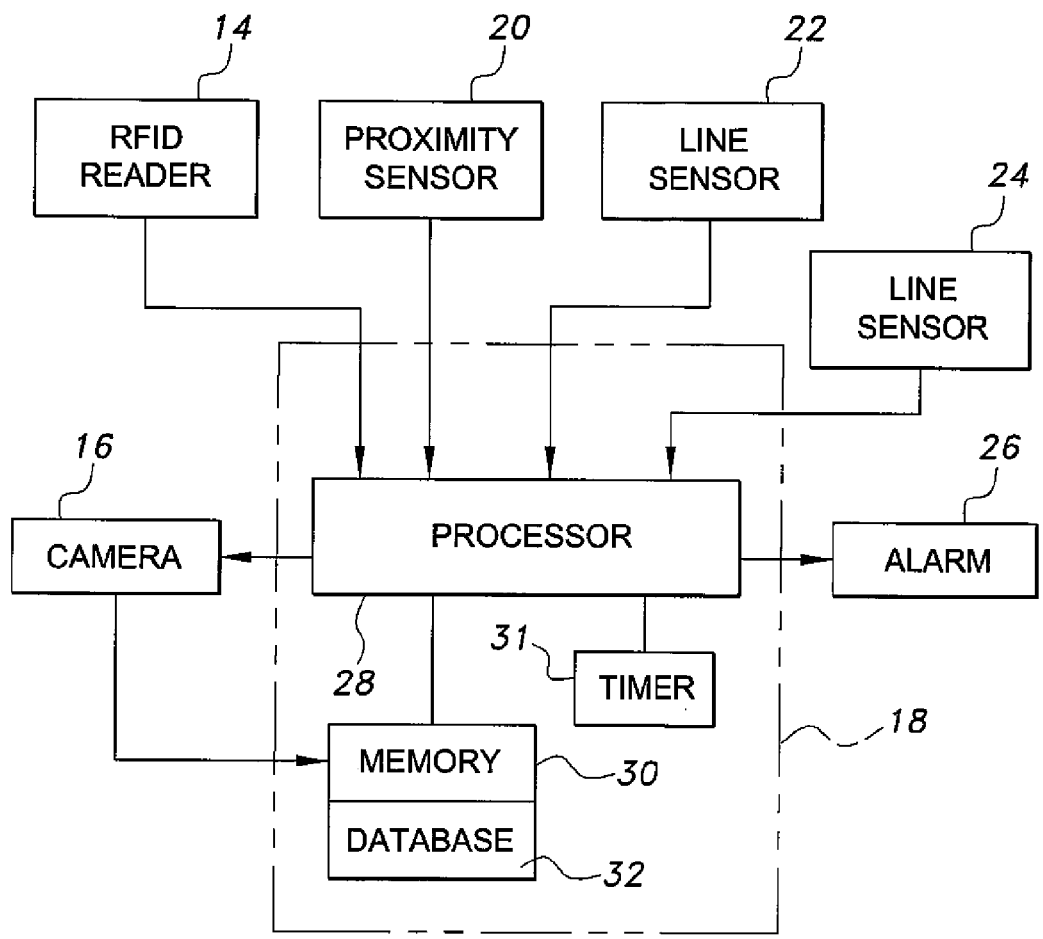
FIG. 2 is a block diagram illustrating system components of an embodiment of a system for disabled parking spot enforcement according to the present invention.

If the RFID tag 12 was detected by the RFID tag reader 14, identifying information therefrom is read by the RFID tag reader 14 and logged in a database 32 stored in or associated with a memory 30 of the controller 18 (as diagrammatically illustrated in FIG. 2). The identifying information can be compared against authentication information, such as including identification (ID) information, stored in the database 32. Additionally, the line sensors 22, 24 are provided for detecting if the vehicle V is properly parked within the designated boundaries of the parking space or parking spot P (i.e., within the line markings L defining the parking space or parking spot P). If the vehicle V is parked over one of the line markings L (i.e., partially parked in an adjacent space), then the alarm 26 can be actuated, for example.

It should be understood that the proximity sensor 20 and the line sensors 22, 24 can be any of various suitable types of sensors for detecting the presence of the vehicle V. For example, in-pavement detectors are well known in the field of traffic control. Such in-pavement detectors are buried in or under the roadway, with inductive detector loops being the most common type. Non-intrusive detectors are also well known in the field of traffic control, including video image processors, sensors that use electromagnetic waves, and acoustic sensors, such as to detect the presence of vehicles at the intersection waiting for a right of way. It should be understood that the proximity sensor 20 and the line sensors 22, 24 can be any of various suitable types of sensors for detecting the presence of vehicle V, as can depend on the use or application, and should not be construed in a limiting sense.

It should be further understood that the operations and instructions in the system and method for disabled parking enforcement can be stored in the memory 30 and can be performed by any or various suitable types of controllers or computer systems, such as that diagrammatically shown in FIG. 2. As shown, the controller 18 includes or is associated with the memory 30, which can be any suitable type of computer readable and programmable memory and is desirably a non-transitory, computer readable storage medium. Calculations and implementation of instructions are performed by a processor 28, which can be any of various suitable types of computer processors. Additionally, the processor 28 can be associated with, or incorporated into, any suitable type of computing device, for example, a personal computer, a programmable logic controller (PLC) or an application specific integrated circuit (ASIC), for example. The processor 28, the memory 30 and any associated computer readable recording media are in communication with one another by any suitable type of data bus, as is well known in the art.

Examples of computer-readable recording media can include non-transitory storage media, a magnetic recording apparatus, an optical disk, a magneto-optical disk, and/or a semiconductor memory (for example, RAM, ROM, etc.). Examples of magnetic recording apparatus that can be used in addition to the memory 30, or in place of the memory 30, can include. a secure digital (SD) card, a memory card, a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. It should be understood that non-transitory computer-readable storage media can include any of various types of computer-readable media, and should not be construed in a limiting sense.

Figure 3:
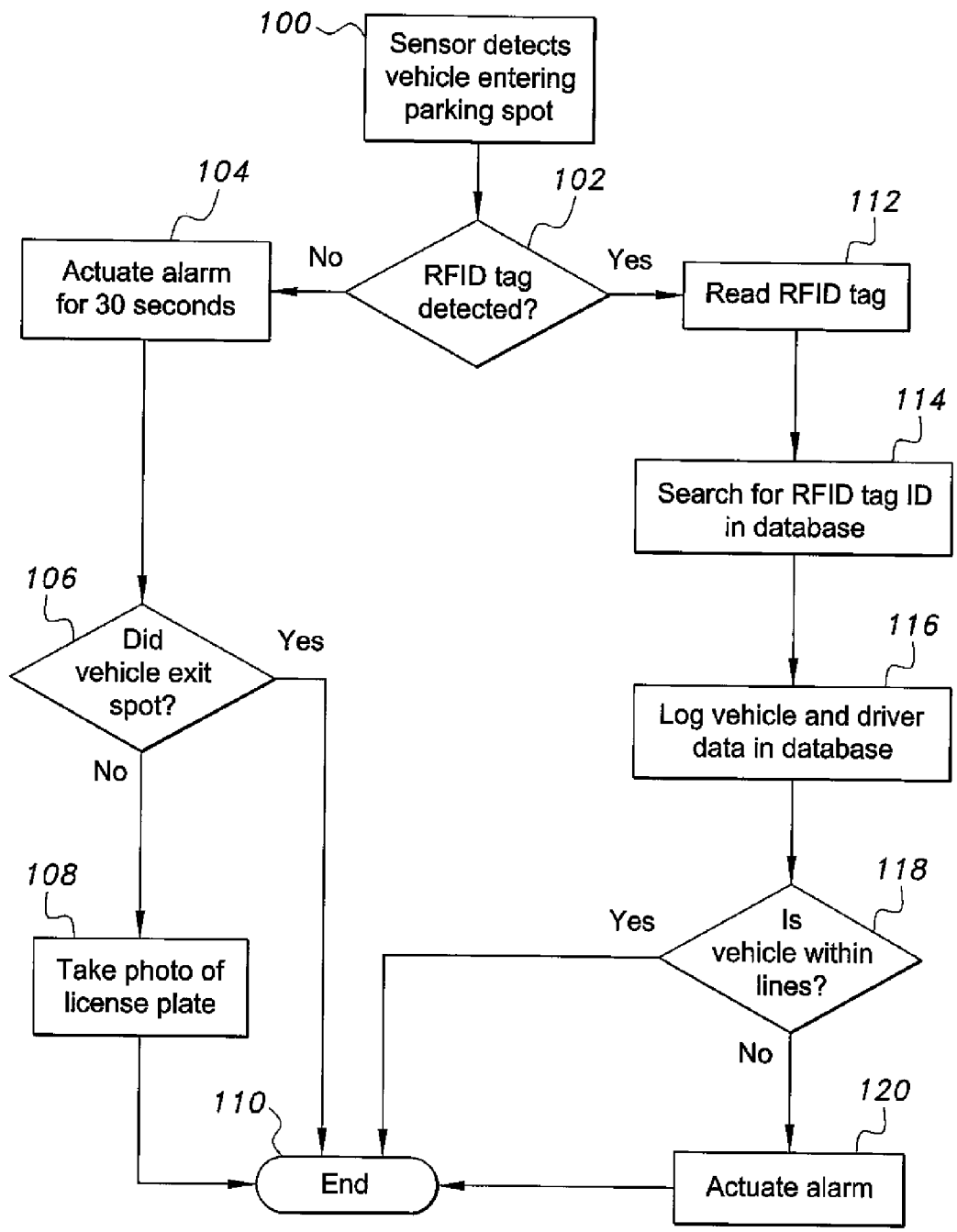
FIG. 3 is a flow chart showing steps of an embodiment of a method for disabled parking spot enforcement according to the present invention.

FIG. 3 illustrates a flow chart showing steps of an embodiment of a method or process for disabled parking spot enforcement. In use, as shown in FIG. 3, the process begins at step 100 where the proximity sensor 20, such as can include one or more ultrasonic sensors, for example, initially detects entry of the vehicle V within the parking spot P designated for use by disabled people. Upon detection of the presence of the vehicle V within the parking spot P at step 100, the process proceeds to step 102 where the RFID tag reader 14 polls for the presence of an RFID tag 12 associated with the vehicle V.

If an RFID tag 12 associated with the vehicle V is not detected at step 102, the process proceeds to step 104 where the alarm 26 is actuated for a pre-set period of time, such as, for example, 30 seconds, such pre-set period of time can be counted by a timer 31 integrated or associated with the controller 18 and the expiration of the pre-set period of time can be determined by the timer 31, for example. Following actuation of the alarm 26 at step 104, the process proceeds to step 106 where the proximity sensor 20 detects and provides information to the controller 18 whether the vehicle V exited the parking spot P within the pre-set period of time. If it is determined at step 106 by the controller 18 that the vehicle V exited the parking spot P within the pre-set period of time, then the process proceeds to step 110 and ends.

However, at step 106, if it is determined by the controller 18 that the vehicle V remained in the parking spot P beyond the pre-set period of time, then the process proceeds to step 108 where the camera 16 captures a photographic image of identifying information, such as an image of the license plate LP, associated with the vehicle V, as well as can also capture an image of at least a portion of the vehicle V, for example. This image is stored in the memory 30 of or associated with the controller 18 for subsequent transmission, by any of various suitable wired and/or wireless communication methods, or other suitable methods, for example, to the proper authorities. The image of the vehicle V is desirably tagged with time, date and location information by the controller 18, such as for purposes of assessing and assigning fines, for example. From step 108, the process proceeds to step 110 and ends.

If, however, at step 102 it is determined by the controller 18 that the vehicle V carries the RFID tag 12, then the process proceeds to step 112 where the RFID tag reader 14 reads identifying information from the RFID tag 12, and the process proceeds to step 114 where the controller 18 compares the identifying information from the RFID tag 12 against authorizing information stored in the database 32, such as can be included in or associated with the memory 30.

The process then proceeds to step 116 where the controller 18 logs the identifying information from the RFID tag 12 in the database 32, which can be stored in the memory 30. The identifying information from the RFID tag 12 desirably can include identifying information for both the person authorized to make use of disabled parking spaces or parking spots P, as well as identifying information related to vehicle V. The identifying information is recorded by the controller 18 in the database 32 in or associated with the memory 30 at step 116. Also, at step 116, other related information to the parking of the vehicle V in the parking spot P can be recorded by the controller 18 in the database 32 in or associated with the memory 30, such as a time, a date and location information associated with the parking event in the particular parking spot P, for example.

From step 116, the process proceeds to step 118 where, additionally, the one or more line sensors, such as the line sensors 22, 24, as can include ultrasonic sensors, for example, detect whether the vehicle V is parked outside of the one or more designated boundaries of the parking spot P (such as marked by line markings L). If it is determined by the controller 18 at step 118 that the vehicle V is positioned within the designated boundaries of the parking spot P, the process proceeds to step 110 and ends. However, if it is determined by the controller 18 at step 118 that the vehicle V is not within the line markings L (i.e., if the vehicle V is partially parked in at least one adjacent parking spot, over at least one of the line markings L, for example), based on information received from the one or more line sensors 22, 24, then the process proceeds to step 120, where the controller 18 actuates the alarm 26, such as for a pre-set period of time, for example, to alert the driver of the vehicle V to the misalignment of the vehicle V within the parking space or parking spot P. From step 120, the process proceeds to step 110 and ends.

It is to be understood that the present invention is not limited to the embodiments described above, but encompasses any and all embodiments within the scope of the following claims.

We claim:

1. A method for disabled parking spot enforcement, comprising the steps of:

detecting entry of a vehicle within a parking spot designated for use by disabled people;
polling for the presence of a radiofrequency identification (RFID) tag associated with the vehicle;
if an RFID tag associated with the vehicle is not detected, then actuating an alarm for a pre-set period of time;
detecting whether the vehicle exited the parking spot within the pre-set period of time if the RFID tag was not detected;
capturing a photographic image of a license plate associated with the vehicle if the RFID tag was not detected and if the vehicle did not exit the parking spot within the pre-set period of time;
reading identifying information from the RFID tag if the RFID tag was detected; and
logging the identifying information in a database if the RFID tag was detected.

2. The method for disabled parking spot enforcement as recited in claim 1, further comprising the step of:
comparing the identifying information from the RFID tag with authenticating information stored in the database.

3. The method for disabled parking spot enforcement as recited in claim 2, further comprising the step of:
detecting whether the vehicle is parked outside of one or more designated boundaries of the parking spot if the RFID tag was detected.

4. The method for disabled parking spot enforcement as recited in claim 3, further comprising the step of:
actuating the alarm if the vehicle is parked outside of the one or more designated boundaries of the parking spot if the RFID tag was detected.

5. A method for disabled parking spot enforcement, comprising the steps of:
detecting entry of a vehicle within a parking spot designated for use by disabled people;
polling for the presence of a radiofrequency identification (RFID) tag associated with the vehicle;
if an RFID tag associated with the vehicle is not detected, then actuating an alarm for a pre-set period of time;
detecting whether the vehicle exited the parking spot within the pre-set period of time if the RFID tag was not detected;
capturing a photographic image of a license plate associated with the vehicle if the RFID tag was not detected and if the vehicle did not exit the parking spot within the pre-set period of time;
reading identifying information from the RFID tag if the RFID tag was detected;
logging the identifying information in a database if the RFID tag was detected;
detecting whether the vehicle is parked outside of one or more designated boundaries of the parking spot if the RFID tag was detected; and
actuating the alarm if the vehicle is parked outside of the one or more designated boundaries of the parking spot if the RFID tag was detected.

6. The method for disabled parking spot enforcement as recited in claim 5, further comprising the step of:
comparing the identifying information from the RFID tag with authenticating information stored in the database.

7. A system for disabled parking spot enforcement, comprising:
a proximity sensor for detecting entry of a vehicle within a parking spot designated for use by disabled people;
a radiofrequency identification (RFID) tag reader positioned adjacent the parking spot for polling for the presence of an RFID tag associated with the vehicle;
an alarm positioned adjacent the parking spot;
means for actuating the alarm for a pre-set period of time if an RFID tag associated with the vehicle is not detected;
a camera positioned adjacent the parking spot for capturing a photographic image of a license plate associated with the vehicle if the RFID tag was not detected and if the vehicle did not exit the parking spot within the pre-set period of time; and
means for reading and logging identifying information from the RFID tag if the RFID tag was detected.

8. The system for disabled parking spot enforcement as recited in claim 7, wherein the means for reading and logging identifying information from the RFID tag comprises
the RFID tag reader to read the identifying information from the RFID tag, and
a controller associated with a processor and a memory to log the identifying information read from the RFID tag.

9. The system for disabled parking spot enforcement as recited in claim 8, wherein the controller further compares the identifying information from the RFID tag with authenticating information stored in a database.

10. The system for disabled parking spot enforcement as recited in claim 9, wherein the means for actuating the alarm for a pre-set period of time if an RFID tag associated with the vehicle is not detected comprises
the controller associated with the processor to actuate the alarm for the pre-set period of time, and
wherein the pre-set period of time is counted by a timer associated with the controller and the expiration of the pre-set period of time is determined by the timer associated with the controller.

11. The system for disabled parking spot enforcement as recited in claim 10, wherein the controller associated with the processor further actuates the alarm when, if the RFID tag was detected, the controller determines the vehicle is parked outside of one or more designated boundaries of the parking spot based on at least one line sensor detecting that the vehicle is parked outside of the one or more designated boundaries of the parking spot.

12. The system for disabled parking spot enforcement as recited in claim 7, further comprising:
means for comparing the identifying information from the RFID tag with authenticating information stored in a database.

13. The system for disabled parking spot enforcement as recited in claim 12, wherein the means for comparing the identifying information from the RFID tag with authenticating information stored in a database comprises
a controller associated with a processor to compare the identifying information from the RFID tag with authenticating information stored in the database.

14. The system for disabled parking spot enforcement as recited in claim 7, further comprising:
means for actuating the alarm if the vehicle is parked outside of one or more designated boundaries of the parking spot if the RFID tag was detected.

15. The system for disabled parking spot enforcement as recited in claim 14, wherein the means for actuating the alarm if the vehicle is parked outside of one or more designated boundaries of the parking spot if the RFID tag was detected comprises
a controller associated with a processor to actuate the alarm when the controller determines the vehicle is parked outside of the one or more designated boundaries of the parking spot based on at least one line sensor detecting that the vehicle is parked outside of the one or more designated boundaries of the parking spot.

16. The system for disabled parking spot enforcement as recited in claim 15, wherein the means for actuating the alarm for the pre-set period of time if the RFID tag associated with the vehicle is not detected comprises the controller associated with the processor, and
wherein the pre-set period of time is counted by a timer associated with the controller and the expiration of the pre-set period of time is determined by the timer associated with the controller.

17. The system for disabled parking spot enforcement as recited in claim 7, further comprising:
at least one line sensor for detecting whether the vehicle is parked outside of one or more designated boundaries of the parking spot if the RFID tag was detected.

18. The system for disabled parking spot enforcement as recited in claim 17, further comprising:
means for actuating the alarm if the vehicle is parked outside of the one or more designated boundaries of the parking spot if the RFID tag was detected.

19. The system for disabled parking spot enforcement as recited in claim 18, wherein the means for actuating the alarm if the vehicle is parked outside of the one or more designated boundaries of the parking spot if the RFID tag was detected comprises a controller associated with a processor to actuate the alarm when the controller determines the vehicle is parked outside of the one or more designated boundaries of the parking spot based on the at least one line sensor detecting that the vehicle is parked outside of the one or more designated boundaries of the parking spot.

* * * * *